United States Patent [19]

Brunelle et al.

[11] Patent Number: 4,775,741

[45] Date of Patent: Oct. 4, 1988

[54] PREPARATION OF RESIN COMPOSITION FROM CYCLIC POLYCARBONATE OLIGOMERS FROM SPIROBIINDANE BISPHENOL

[75] Inventors: Daniel J. Brunelle, Scotia; Thomas L. Evans, Clifton Park; Thomas G. Shannon, Schenectady, all of N.Y.

[73] Assignee: General Electric Company, Schenectady, N.Y.

[21] Appl. No.: 59,297

[22] Filed: Jun. 8, 1987

Related U.S. Application Data

[60] Division of Ser. No. 887,503, Jul. 21, 1986, Pat. No. 4,736,016, which is a continuation-in-part of Ser. No. 704,122, Feb. 22, 1985, Pat. No. 4,644,053, which is a continuation-in-part of Ser. No. 871,641, Jun. 6, 1980, Pat. No. 4,727,134, said Ser. No. 704,122, is a continuation-in-part of Ser. No. 609,407, May 11, 1984, abandoned.

[51] Int. Cl.$^4$ ............................................. C08G 63/62
[52] U.S. Cl. ...................................... 528/371; 528/196; 528/201; 528/370

[58] Field of Search ................ 528/371, 370, 196, 201

[56] References Cited

U.S. PATENT DOCUMENTS

| | | | |
|---|---|---|---|
| 4,605,731 | 8/1986 | Evans et al. | 528/371 |
| 4,636,559 | 1/1987 | Rosenquist et al. | 528/371 |
| 4,644,053 | 2/1987 | Brunelle et al. | 528/370 |
| 4,696,997 | 9/1987 | Rosenquist | 528/371 |
| 4,701,519 | 10/1987 | Evans et al. | 528/371 |
| 4,727,134 | 2/1988 | Brunelle et al. | 528/371 |

*Primary Examiner*—Harold D. Anderson
*Attorney, Agent, or Firm*—William H. Pittman; James C. Davis, Jr.; James Magee, Jr.

[57] ABSTRACT

Cyclic polycarbonate mixtures containing units derived from spirobiindane bisphenols, preferably 6,6'-dihydroxy-3,3,3',3'-tetramethylspirobiindane are prepared from the corresponding bischloroformates or mixtures thereof with bisphenols. They may be homopolymeric or copolymeric; cyclic oligomer mixtures are preferred. Such oligomers may be converted to linear polycarbonates having high glass transition temperatures.

15 Claims, No Drawings

PREPARATION OF RESIN COMPOSITION FROM CYCLIC POLYCARBONATE OLIGOMERS FROM SPIROBIINDANE BISPHENOL

This application is a division of copending application Ser. No. 887,503, filed July 21, 1986, now U.S. Pat. No. 4,736,016, which is a continuation-in-part of applications Ser. No. 704,122, filed Feb. 22, 1985, now U.S. Pat. No. 4,644,053, and Ser. No. 871,641, filed June 6, 1986 now U.S. Pat. No. 4,727,134, Ser. No. 704,122 is in turn a continuation-in-part of Ser. No. 609,407, filed May 11, 1984, now abandoned.

This invention relates to novel cyclic polycarbonate oligomers and the conversion thereof to linear polycarbonates.

The aforementioned parent applications disclose and claim cyclic polycarbonate oligomer mixtures derived from a wide variety of dihydroxy compounds, especially bisphenols. They also disclose a method for polymerizing said cyclic polycarbonate oligomer mixtures, with the formation of linear polycarbonates often having very high molecular weights. However, the glass transition temperatures of such linear polycarbonates are frequently low, as illustrated by about 155° C. for bisphenol A homopolycarbonate and 176° and 164° C. for copolycarbonates of 90 mole percent bisphenol A and 10 mole percent 1,1-bis(4-hydroxyphenyl)cyclododecane and bis(4-hydroxyphenyl) sulfone, respectively.

The present invention provides a new class of cyclic polycarbonate oligomers and a method for their preparation. It also provides a method for the conversion of such cyclic oligomers to linear polycarbonates having relatively high glass transition temperatures.

The invention is based on the discovery that 6,6'-dihydroxy-3,3,3',3'-tetramethylspirobiindanes are capable of particularly facile conversion to cyclic polycarbonate oligomers, including both cyclic homopolycarbonates and cyclic copolycarbonates with other dihydroxy compounds. These cyclic oligomers may be converted to linear polycarbonates having particularly useful and interesting properties including high glass transition temperatures, which make them valuable for use in various applications.

In one of its aspects, the present invention includes compositions comprising cyclic oligomers containing spirobiindane structural units of the formula

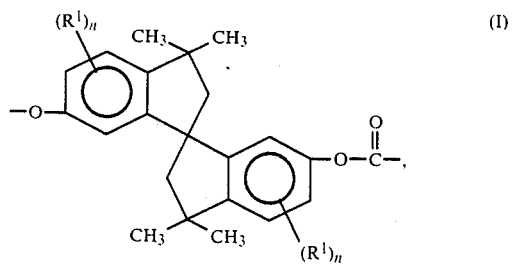

wherein each $R^1$ is independently $C_{1-4}$ primary or secondary alkyl or halo and n is from 0 to 3.

The spirobiindane units of formula I are obviously derived from the previously mentioned 6,6'-dihydroxy-3,3,3',3'-tetramethylspirobiindanes (hereinafter "spirobiindane bisphenols"), which may be substituted or unsubstituted. These compounds may in turn be prepared by the sulfuric acid-catalyzed condensation of bisphenols of the formula

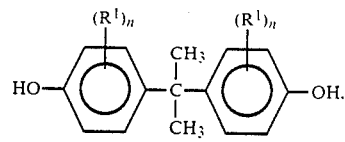

as disclosed, for example, in U.S. Pat. No. 3,271,463.

The $R^1$ values in formula I may be alkyl radicals such as methyl, ethyl, 1-propyl or 2-propyl, or halo atoms such as chloro or bromo. Among compounds containing such $R^1$ values, methyl and chloro are preferred; however, the most preferred compound is 6,6'-dihydroxy-3,3,3',3'-tetramethylspirobiindane, in which n is 0. This compound is frequently identified hereinafter as "SBI".

The cyclic polycarbonate oligomers of this invention may be homopolycarbonates, in which all of the structural units have formula I with identical $R^1$ and/or n values. They may also be copolycarbonates, including those in which a portion of the structural units are different from formula I and have the formula

wherein at least about 60% of the total number of $R^2$ values are aromatic organic radicals and the balance thereof are aliphatic, alicyclic or aromatic organic radicals. Such copolycarbonates may contain units of formulas I and II in any proportions. Most often, however, they contain at least about 10 mole percent of units of formula I.

The various $R^2$ values in the units of formula II may be different but are usually the same. At least about 60% of the total number of $R^2$ values are aromatic and the balance may be aliphatic, alicyclic, aromatic or mixed; those which are aliphatic or alicyclic generally contain up to about 8 carbon atoms. The $R^2$ values may contain substituents such as halo, nitro, alkoxy, lactone and the like. Most often, however, all $R^2$ radicals are hydrocarbon radicals.

Preferably at least about 80% of the total number of $R^2$ values in the cyclic oligomer mixtures, and most desirably all of said $R^2$ values, are aromatic. The aromatic $R^2$ radicals preferably have the formula

wherein each of $A^1$ and $A^2$ is a monocyclic divalent aromatic radical and $Y^1$ is a bridging radical in which one or two atoms separate $A^1$ from $A^2$. The free valence bonds in formula III are usually in the meta or para positions of $A^1$ and $A^2$ in relation to $Y^1$.

In formula III, the $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, $Y^1$, is one in which one or two atoms, preferably one, separate $A^1$ from $A^2$. It is most often a hydrocarbon radical and particularly a saturated radical such as methylene, cyclohexylmethylene, 2-[2.2.1]bicyclohptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone.

The $R^2$ values may be considered as being derived from dihydroxy compounds of the formula HO—R$^2$—OH, especially dihydroxyaromatic compounds and preferably bisphenols of the formula HO—A$^1$—Y$^1$—A$^2$—OH. The following dihydroxy compounds are illustrative:

Ethylene glycol
Propylene glycol
1,3-Propanediol
1,4-Butanediol
1,6-Hexanediol
1,12-Dodecanediol
2-Ethyl-1,10-decanediol
2-Butene-1,4-diol
1,3-Cyclopentanediol
1,3-Cyclohexanediol
1,4-Cyclohexanediol
1,4-Bis(hydroxymethyl)benzene (which is a vinylog of ethylene glycol and has similar properties)
Resorcinol
4-Bromoresorcinol
Hydroquinone
4,4'-Dihydroxybiphenyl
1,6-Dihydroxynaphthalene
2,6-Dihydroxynaphthalene
Bis(4-hydroxyphenyl)methane
Bis(4-hydroxyphenyl)diphenylmethane
Bis(4-hydroxyphenyl)-1-naphthylmethane
1,1-Bis(4-hydroxyphenyl)ethane
1,2-Bis(4-hydroxyphenyl)ethane
1,1-Bis(4-hydroxyphenyl)-1-phenylethane
2,2-Bis(4-hydroxyphenyl)propane ("bisphenol A")
2-(4-Hydroxyphenyl)-2-(3-hydroxyphenyl) propane
2,2-Bis(4-hydroxyphenyl)butane
1,1-Bis(4-hydroxyphenyl)isobutane
1,1-Bis(4-hydroxyphenyl)cyclohexane
1,1-Bis(4-hydroxyphenyl)cyclododecane
Trans-2,3-bis(4-hydroxyphenyl)-2-butene
2,2-Bis(4-hydroxyphenyl)adamantane
α, α'-Bis(4-hydroxyphenyl)toluene
Bis(4-hydroxyphenyl)acetonitrile
2,2-Bis(3-methyl-4-hydroxyphenyl)propane
2,2-Bis(3-ethyl-4-hydroxyphenyl)propane
2,2-Bis(3-n-propyl-4-hydroxyphenyl)propane
2,2-Bis(3-isopropyl-4-hydroxyphenyl)propane
2,2-Bis(3-sec-butyl-4-hydroxyphenyl)propane
2,2-Bis(3-t-butyl-4-hydroxyphenyl)propane
2,2-Bis(3-cyclohexyl-4-hydroxyphenyl)propane
2,2-Bis(3-allyl-4-hydroxyphenyl)propane
2,2-Bis(3-methoxy-4-hydroxyphenyl)propane
2,2-Bis(3,5-dimethyl-4-hydroxyphenyl)propane
2,2-Bis(2,3,5,6-tetramethyl-4-hydroxyphenyl)propane
2,2-Bis(3-5-dichloro-4-hydroxyphenyl)propane
2,2-Bis(3,5-dibromo-4-hydroxyphenyl)propane
2,2-Bis(2,6-dibromo-3,5-dimethyl-4-hydroxyphenyl)propane
α, α-Bis(4-hydroxyphenyl)toluene
α,α, α', α'-Tetramethyl-α,α'-bis(4-hydroxyphenyl)-p-xylene
2,2-Bis(4-hydroxyphenyl)hexafluoropropane
1,1-Dichloro-2,2-bis(4-hydroxyphenyl)ethylene
1,1-Dibromo-2,2-bis(4-hydroxyphenyl)ethylene
1,1-Dichloro-2,2-bis(5-phenoxy-4-hydroxyphenyl)ethylene
4,4'-Dihydroxybenzophenone
3,3-Bis(4-hydroxyphenyl)-2-butanone
1,6-Bis(4-hydroxyphenyl)-1,6-hexanedione
Ethylene glycol bis(4-hydroxyphenyl) ether
Bis(4-hydroxyphenyl) ether
Bis(4-hydroxyphenyl) sulfide
Bis(4-hydroxyphenyl) sulfoxide
Bis(4-hydroxyphenyl) sulfone
Bis(3,5-dimethyl-4-hydroxyphenyl) sulfone
9,9-Bis(4-hydroxyphenyl)fluorene
2,7-Dihydroxypyrene
3,3-Bis(4-hydroxyphenyl)phthalide
2,6-Dihydroxydibenzo-p-dioxin
2,6-Dihydroxythianthrene
2,7-Dihydroxyphenoxathiin
2,7-Dihydroxy-9,10-dimethylphenazine
3,6-Dihydroxydibenzofuran
3,6-Dihydroxydibenzothiophene
2,7-Dihydroxycarbazole.

Bisphenol A is often preferred as the source of the $R^2$ value, for reasons of availability and particular suitability for the purposes of the invention.

The cyclic oligomers have degrees of polymerization from 2 to about 30 and preferably to about 20, with a major proportion being up to about 12 and a still larger proportion up to about 15. Mixtures of such oligomers having varying degrees of polymerization are preferred, since they have relatively low melting points as compared to single compounds such as the corresponding cyclic trimer. The cyclic oligomer mixtures are generally liquid at temperatures above 300° C. and most often at temperatures above 225° C.

The cyclic oligomer compositions of this invention contain very low proportions of linear oligomers. In general, no more than about 10% by weight, and most often no more than about 5%, of such linear oligomers are present. The mixtures also usually contain low percentages (frequently less than 20%) of polymers (linear or cyclic) having a degree of polymerization greater than about 30. Such polymers are frequently identified hereinafter as "high polymer". These properties, coupled with the relatively low melting points and viscosities of the cyclic oligomer mixtures, contribute to their utility as resin precursors, especially for high molecular weight resins, as described hereinafter.

The cyclic polycarbonate oligomer compositions of this invention may be prepared by reacting (A) a composition comprising (A-1) at least one compound of the formula

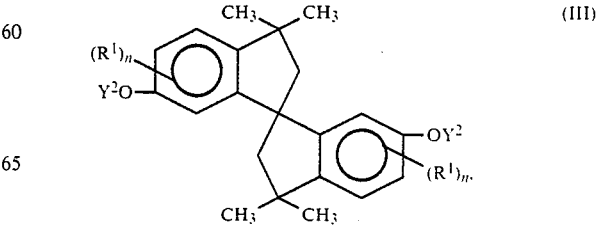

(III)

or a mixture thereof with (A-2) at least one compound of the formula $$Y^3O—R^2—OY^3 \quad (IV)$$

wherein $R^1$ and $R^2$ are as previously defined, the $Y^2$ and $Y^3$ values in each compound are both H or

C—X and X is chlorine or bromine, at least about 75% of the total number of $Y^2$ and $Y^3$ moieties being

C—X;

with
(B) at least one oleophilic aliphatic or heterocyclic tertiary amine and
(C) an aqueous alkali or alkaline earth metal hydroxide or carbonate solution; in
(D) a substantially non-polar organic liquid which forms a two-phase system with water. The details of preparation are similar to those for preparing cyclic polycarbonate oligomer mixtures as described in European patent application No. 162,379 abandoned and in the aforementioned copending application Ser. No., 704,122 , U.S. Pat. No. 4,644,053 and application Ser. No. 871,641, now U.S. Pat. No. 4,727,134 the disclosures of which are incorporated by reference herein.

It will be apparent from the foregoing that at least one compound within the class identified as reagent A must be a bishaloformate. While the X values may be chlorine or bromine, the bischloroformates, in which X is chlorine, are most readily available and their use is therefore preferred. Frequent reference to bischloroformates will be made hereinafter, but it should be understood that other bishaloformates may be substituted therefor as appropriate.

The bischloroformate components of reagent A are present in major proportion, at least about 60%, preferably at least about 75% and most preferably at least about 90% of the total number of $Y^2$ and $Y^3$ moieties being chloroformate moieties. Any remaining compounds forming part of reagent A are dihydroxy compounds, preferably bisphenols.

When free SBI constitutes part of reagent A, it may be necessary to employ a minor proportion of a solvent therefor, such as tetrahydrofuran, to ensure its dissolution in the reaction mixture. Most often, however, reagent A consists essentially of bischloroformates.

The proportions of reagents A-1 and A-2 in the reaction mixture will depend on whether the cyclic composition being prepared is a homopolycarbonate (whereupon only reagent A-1 will be used) or a copolycarbonate. As previously mentioned, the copolycarbonates generally comprise at least about 10 mole percent of units of formula I, and therefore require at least about 10 mole percent of reagent A-1 in the reaction mixture, with the balance being reagent A-2.

The bischloroformates used as reagent A-1 may be employed in substantially pure, isolated form. For this purpose, it is possible to prepare SBI bischloroformate by a variation of the method described in Example 4 of British patent No. 613,280, substituting diethylaniline for the dimethylaniline recited therein.

It is frequently preferred, however, to use one or more crude bischloroformate products. Suitable crude products may be prepared by any known methods for bischloroformate preparation. Typically, at least one bisphenol (and, for the preparation of copolycarbonates, a mixture of bisphenols such as those of bisphenol A and SBI) is reacted with phosgene in the presence of a substantially inert organic liquid, as disclosed in the following U.S. Pat. Nos.

| 3,255,230 | 3,966,785 |
| 3,312,661 | 3,974,126. |

The disclosures of these patents are incorporated by reference herein.

In addition to the bisphenol bischloroformate, such crude bischloroformate products may contain oligomer bischloroformates. Most often, a major proportion of the crude product comprises monomer, dimer and trimer bischloroformate. Higher oligomer bischloroformates, and monochloroformates corresponding to any of the aforementioned bischloroformates, may also be present, preferably only in relatively small amounts.

More preferably, the preparation of the crude bischloroformate product takes place in the presence of aqueous alkali. The pH of the reaction mixture may be up to about 12. It is generally found, however, that the proportion of high polymer in the cyclic oligomer mixture is minimized by employing a crude bischloroformate product comprising a major amount of bisphenol bischloroformate and only minor amounts of any oligomer bischloroformates. Such products may be obtained by a variant of the method disclosed in copending, commonly owned application Ser. No. 790,909, filed Feb. 24, 1985, U.S. Pat. No. 4,638,077, Jan. 20, 1987 the disclosure of which is also incorporated by reference herein.

In that method, phosgene is passed into a mixture of a substantially inert organic liquid and a bisphenol, said mixture being maintained at a temperature within the range of about 10°–40° C., the phosgene flow rate being at least 0.15 equivalent per equivalent of bisphenol per minute when the temperature is above 30° C. An aqueous alkali metal or alkaline earth metal base solution is simultaneously introduced as necessary to maintain the pH in the range of about 0.5–8.0. By this method, it is possible to prepare bischloroformates of compounds such as bisphenol A in high yield while using a relatively small proportion of phosgene, typically up to about 1.1 equivalent per equivalent of bisphenol.

For the preparation of SBI bischloroformate compositions, the above-described method is not satisfactory since SBI swells and gels in water-methylene chloride mixtures at low pH. The monochloroformate of SBI is, however, apparently soluble in such mixtures (particularly in the methylene chloride phase thereof).

Therefore, it is possible to prepare SBI bischloroformate compositions by passing phosgene into a heterogeneous mixture of solid SBI, a substantially inert organic liquid (e.g., methylene chloride) and an aqueous alkali metal or alkaline earth metal base solution, said mixture being maintained at a temperature within the range of about 10°–40° C. and at a pH of the aqueous phase in the range of about 8–14, until all solids have dissolved, and then continuing phosgene passage as the pH is decreased to a value in the range of 2-8, preferably 2-5. This method is disclosed and claimed in copending, commonly owned application Ser. No. 926,685, filed Nov. 4, 1986.

When one of these methods is employed, it is obvious that the crude bischloroformate product will ordinarily be obtained as a solution in a substantially non-polar organic liquid such as those disclosed hereinafter. Depending on the method of preparation, it may be desirable to wash said solution with a dilute aqueous acidic solution to remove traces of base used in preparation.

The tertiary amines useful as reagent B ("tertiary" in this context denoting the absence of N-H bonds) generally comprise those which are oleophilic (i.e., which are soluble in and highly active in organic media, especially those used in the oligomer preparation method of this invention), and more particularly those which are useful for the formation of polycarbonates. Reference is made, for example, to the tertiary amines disclosed in U.S. Pat. Nos. 4,217,438 and 4,368,315, the disclosures of which are incorporated by reference herein. They include aliphatic amines such as triethylamine, tri-n-propylamine, diethyl-n-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and reagent A is essential for the formation of the cyclic oligomer composition. For the most part, such amines contain at least about 6 and preferably about 6-14 carbon atoms.

The amines most useful as reagent B are trialkylamines containing no branching on the carbon atoms in the 1 and 2-positions. Especially preferred are tri-n-alkylamines in which the alkyl groups contain up to about 4 carbon atoms. Triethylamine is most preferred by reason of its particular availability, low cost, and effectiveness in the preparation of products containing low percentages of linear oligomers and high polymers.

Reagent C is an aqueous alkali or alkaline earth metal hydroxide or carbonate solution, such as lithium, sodium, potassium or calcium hydroxide or sodium or potassium carbonate. It is most often lithium, sodium or potassium hydroxide, with sodium hydroxide being preferred because of its availability and relatively low cost. The concentration of the solution is not critical and may be about 0.1-16M, preferably about 0.2-10M.

The fourth essential component (component D) in the cyclic oligomer preparation method is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran. Methylene chloride is generally preferred.

To prepare the cyclic oligomer composition according to the above-described method, the reagents and components are maintained in contact under conditions whereby reagent A is present in low concentration. Actual high dilution conditions, requiring a large proportion of component D, may be employed but are usually not preferred for cost and convenience reasons. Instead, simulated high dilution conditions known to those skilled in the art may be employed. For example, in one embodiment of the method reagent A (and optionally other reagents) are added gradually to a reaction vessel containing solvent.

Although addition of reagent A neat (i.e., without solvents) is within the scope of this embodiment, it is frequently inconvenient because many bischloroformates are solids. Therefore, it is preferably added as a solution in a portion of component D, especially when it consists essentially of bischloroformate. The proportion of component D used for this purpose is not critical; about 25-75% by weight, and especially about 40-60%, is preferred.

The reaction temperature is generally in the range of about 0°-50° C. It is most often about 0°-40° C. and preferably 20°-40° C.

For maximization of the yield and purity of cyclic oligomers as opposed to high polymer and insoluble and/or intractable by-products, it is preferred to use not more than about 1.5 mole of reagent A, calculated as bisphenol bischloroformate (and bisphenol if present), per liter of component D in the reaction system, including any liquid used to dissolve reagent A. Preferably, about 0.003-1.0 mole of reagent A is used when it consists entirely of bischloroformate, and no more than about 0.5 mole is used when it is a bisphenol-bischloroformate mixture. It should be noted that this is not a molar concentration in component D when reagent A is added gradually, since said reagent is consumed as it is added to the reaction system.

The molar proportions of the reagents constitute another important feature for yield and purity maximization. The preferred molar ratio of reagent B to reagent A consisting essentially of bischloroformate is about 0.1-1.0:1 and most often about 0.15-0.6:1, and that of reagent C to reagent A is about 1.5-3:1 and most often about 2-3:1. When a bischloroformate-bisphenol combination is used, the preferred molar ratio for reagent B is about 0.1-0.5:1.

A highly preferred method for preparing the cyclic oligomer compositions of this invention comprises conducting the reaction using as reagent B at least one aliphatic or heterocyclic tertiary amine which, under the reaction conditions, dissolves preferentially in the organic phase of the reaction system, and gradually adding reagent A and at least a portion of reagents B and C simultaneously to component D or to a mixture of component D with water, said liquid or mixture being maintained at a temperature in the range of about 0°-50° C.; the amount of reagent A used being up to about 0.7 mole for each liter of component D present in the reaction system, and the total molar proportions of reagents A, B and C being approximately as follows:

B:A - 0.06-2.0:1
C:A - 2-3:1;

and recovering the cyclic oligomers thus formed.

A factor of some importance in this embodiment is the concentration of available reagent B, which should be maintained at a level as constant as possible during the entire addition period for reagent A. If all of reagent B is present in the reaction vessel into which reagent A is introduced, its concentration steadily decreases, principally by dilution. On the other hand, if reagent B is introduced continuously or in equal increments during introduction of reagent A, its available concentration is initially low and increases more or less steadily during the addition period. These fluctuations can result in a high and constantly varying proportion of high polymer in the product.

It has been found advantageous to introduce reagent B in one initial large portion, usually about 40-95% and preferably about 40-75% by weight of the total amount, followed by incremental or continuous addition of the balance thereof. By this procedure, the concentration of available reagent B is maintained at a fairly constant level in the organic phase during the entire addition period, and it is possible to minimize the proportion of high polymer in the product. Typically, high polymer content is 10% or less when this mode of addition is used.

Under these conditions, it is usually advantageous for the reaction vessel to initially contain about 5-40% and preferably about 5-30% of total reagent C. The balance thereof is also introduced continuously or incrementally. As in the embodiment previously described, another portion of component D may serve as a solvent for reagent A.

Among the other principal advantages of this preferred embodiment are the non-criticality of the degree of dilution of the reagents and the ability to complete the addition and reaction in a relatively short time, regardless of reaction scale. It ordinarily takes only about 25-30 minutes to complete cyclic oligomer preparation by this method, and the cyclic oligomer yield may be 85-90% or more. By contrast, use of a less preferred embodiment may, depending on reaction scale, require an addition period as long as 8-10 hours.

In this preferred embodiment, the pH of the reaction mixture is typically in the range of about 9-14 and preferably about 12. When reagent A (and optionally reagent B) is added to all of the reagent C, on the other hand, the initial pH remains on the order of 14 during essentially the entire reaction period.

When the reaction has been completed, impurities may be removed in the necessary amounts by conventional operations such as combining the crude product, as a solid or in solution, with a non-solvent for said impurities. Illustrative non-solvents include esters such as methyl acetate and ethyl acetate.

Recovery of the cyclic oligomers normally means merely separating the same from diluent (by known methods such as vacuum evaporation) and, optionally, from high polymer and other impurities. The degree of sophistication of recovery will depend on such variables as the intended end use of the product.

The distributions of the molecular species in the homopolycarbonate oligomer products of this invention have been proved by reversed phase high pressure liquid chromatography. The product was dissolved in a mixture of tetrahydrofuran and water and chromatographed using a relatively non-polar packing, whereupon more polar constituents including linear oligomers were eluted first, followed by cyclic oligomers of progressively increasing degrees of polymerization and, finally, high polymer. For each molecular species, two values were determined and used for identification: the retention time (in minutes) and the "254/285 value". The latter is defined as the ratio of the areas under the ultraviolet absorption peaks at 254 and 285 nm. Both of these wavelengths are characteristic of SBI cyclic polycarbonate oligomers, and the 254/285 values for individual oligomers are uniquely identifiable.

Upon analysis by this method, the cyclic SBI homopolycarbonate oligomer mixtures of the present invention have been shown to contain oligomers having degrees of polymerization from 2 to 12, including substantially all of those from 2 to 6. When reagent A is a crude bischloroformate composition containing a substantial proportion of higher oligomers (i.e., above about 3), the cyclic product has been found to contain relatively high proportions of cyclics with degrees of polymerization above 6. By contrast, employment of a bischloroformate composition corresponding predominantly to monomer, dimer and trimer produces mixtures of cyclics containing relatively small proportions of oligomers with degrees of polymerization above 6.

The spirobiindane bisphenols are easily converted by the above-described methods to cyclic oligomer compositions substantially free of high polymer. In this respect, they differ substantially from other bisphenols which require close control of the reaction to accomplish similar results. It is believed that the ease of converting spirobiindane bisphenols to cyclics is a result of their configuration, particularly the angular disposition of the phenolic hydroxy groups thereon. This configuration also has an effect on the preparation and properties of linear polycarbonates prepared from the cyclics, as described in more detail hereinafter.

The preparation of the cyclic oligomer compositions of this invention is illustrated by the following examples. All parts and percentages in the examples herein are by weight unless otherwise indicated. Temperatures are in degrees Celsius. Molecular weights, whenever referred to herein, are weight average unless otherwise indicated and were determined by gel permeation chromatography relative to polystyrene.

EXAMPLE 1

A mixture of 31.7 grams (100 mmol.) of spirobiindane bisphenol, 30 grams (200 mmol.) of N,N-diethylaniline and 500 ml. of methylene chloride was cooled to $-10°$ C. with stirring. Phosgene was bubbled through the solution at 3 grams per minute for 10 minutes (total 300 mmol.). Stirring was continued as the mixture was allowed to warm slowly to room temperature over 2 hours. It was warmed in a water bath and sparged with nitrogen to evaporate about half the methylene chloride, diluted with an equal volume of hexane and washed three times with dilute aqueous hydrochloric acid and once with water. The organic layer was filtered and vacuum stripped, and the resulting oil was dissolved in petroleum ether and filtered. Upon stripping of the petroleum ether, the desired spirobiindane bisphenol bischloroformate was obtained; it comprised about 90% monomer bischloroformate.

A mixture of 80 ml. of methylene chloride, 10 ml. of water, 0.5 ml. of 50% aqueous sodium hydroxide and 0.51 ml. of triethylamine was heated to reflux with stirring. There was added over 30 minutes, with continued stirring, 50 ml. of a 1M solution in methylene chloride of equimolar proportions of bisphenol A bischloroformate and spirobiindane bisphenol bischloroformate. At the same time, 5 ml. of 50% aqueous sodium hydroxide and 0.525 ml. of triethylamine were added in 5 increments at 5-minute intervals. When the addition was complete, the organic and aqueous layers were separated and the aqueous layer was washed with methylene chloride. The combined organic phases were washed three times with dilute aqueous hydrochloric acid and once with water, filtered and vacuum stripped to yield the desired mixed cyclic polycarbonate oligomers.

EXAMPLES 2-6

Following the procedure of Example 1, cyclic bisphenol A-SBI copolycarbonate oligomer compositions having the following proportions were prepared

| Example | SBI, mole % | Bisphenol A, mole % |
|---------|-------------|---------------------|
| 2 | 75 | 25 |
| 3 | 65 | 35 |
| 4 | 35 | 65 |
| 5 | 25 | 75 |
| 6 | 10 | 90 |

In Examples 2-5, reagent A was a mixture of the bischloroformates of SBI and bisphenol A; in Example 6, it was a mixture of bisphenol A bischloroformate and free SBI.

EXAMPLE 7

Phosgene was passed at 1 gram per minute into a mixture of 15.85 grams (50 mmol.) of spirobiindane bisphenol, 10 ml. of 2.5 M aqueous sodium hydroxide and 100 ml. of methylene chloride until a clear solution was obtained, at which point the pH dropped below 7. Phosgene passage was continued for a total of 12 minutes at a pH in the range of 4-6. The crude spirobiindane bisphenol bischloroformate composition was isolated as in Example 1; it was found to contain about 45% monomer bischloroformate, about 28% dimer bischloroformate and about 15% trimer bischloroformate.

Following the procedure of Example 1, a cyclic spirobiindane bisphenol homopolycarbonate mixture was prepared from the crude bischloroformate.

The cyclic oligomer compositions of this invention are useful as intermediates for conversion to linear polycarbonates having high glass transition temperatures. Accordingly, the present invention includes a method for the preparation of a resinous composition which comprises contacting at least one of the previously defined cyclic oligomer compositions with a polycarbonate formation catalyst at a temperature up to about 350° C. The oligomer compositions may frequently be employed in this method without separation of high polymer therefrom, but if desired, high polymer may be removed as previously described.

Previously known methods for forming (e.g., molding) polycarbonates are often cumbersome because of the high viscosities of the polycarbonates. On the other hand, it has not been possible to integrate preparation methods involving the use of phosgene or various monomeric esters with forming operations because of the presence of volatile solvents such as methylene chloride or by-products such as phenol, during or after polymerization. By contrast, the cyclic oligomer compositions of this invention are liquid and substantially non-volatile at resin formation temperatures. Thus, it is possible to integrate resin formation therefrom with such forming operations.

For example, the cyclic oligomer compositions may be polymerized during extrusion or molding operations, upon raising their temperature to conventional extrusion or molding temperatures. Molding and simultaneous polymerization may be achieved by several known techniques, including injection molding and rotational molding.

The polycarbonate formation catalysts which can be used in the resin formation method of this invention include various bases and Lewis acids. It is known that basic catalysts may be used to prepare polycarbonates by the interfacial method, as well as by transesterification and from cyclic oligomers. Reference is made to U.S. Pat. Nos. 3,155,683 and 3,274,214, as well as the aforementioned 4,217,438 and 4,368,315. Such catalysts may also be used to polymerize the cyclic oligomer mixtures. Examples thereof are lithium 2,2,2-trifluoroethoxide, n-butyllithium and tetramethylammonium hydroxide. Also useful are various weakly basic salts such as sodium benzoate and lithium stearate.

A particularly useful class of Lewis bases is disclosed in copending, commonly owned application Ser. No. 723,672, filed Apr. 16, 1985, now U.S. Pat. No. 4,605,731, Aug. 12, 1986. It comprises numerous tetraarylborate salts, including lithium tetraphenylborate, sodium tetraphenylborate, sodium bis(2,2'-biphenylene)borate, potassium tetraphenylborate, tetramethylammonium tetraphenylborate, tetra-n-butylammonium tetraphenylborate, tetramethylphosphonium tetraphenylborate, tetra-n-butylphosphonium tetraphenylborate and tetraphenylphosphonium tetraphenylborate. The preferred catalysts within this class are the tetra-n-alkylammonium and tetra-n-alkylphosphonium tetraphenylborates, particularly the former. Tetramethylammonium tetraphenylborate is particularly preferred because of its high activity, relatively low cost and ease of preparation from tetramethylammonium hydroxide and an alkali metal tetraphenylborate.

Lewis acids useful as polycarbonate formation catalysts include dioctyltin oxide, triethanolaminetitanium isopropoxide, tetra(2-ethylhexyl) titanate and polyvalent metal (especially titanium and aluminum) chelates such as bisisopropoxytitanium bisacetylacetonate (commercially available under the tradename "Tyzor AA") and the bisisopropoxyaluminum salt of ethyl acetoacetate. Among the preferred catalysts are lithium stearate and bisisopropoxytitanium bisacetylacetonate.

The resin formation reaction is typically effected by simply contacting the cyclic oligomer composition with the catalyst at temperatures up to 350° C., preferably about 200°-300° C., until polymerization has proceeded to the extent desired. Although the use of a solvent is within the scope of the invention, it is generally not preferred. In general, the amount of catalyst used is about 0.001-1.0 mole percent based on structural units in the oligomer composition.

Cyclic SBI homopolycarbonate oligomer compositions, upon contact with a polycarbonate formation catalyst at temperatures on the order of 300° C., are converted to equilibrium mixtures comprising about 90 mole percent linear polycarbonate and 10 mole percent cyclics. This is apparently a result of the geometry of the SBI molecule, which is extremely favorable for the formation of cyclics as noted hereinabove. Linear SBI homopolycarbonates are converted to a similar equilibrium mixture upon contact with a polycarbonate formation catalyst under similar conditions. Stable linear polycarbonate may be obtained from such mixtures by quenching the catalyst with acid and precipitating the polycarbonate by addition of a non-solvent therefor. Cyclic copolycarbonates of SBI with at least about 35 mole percent of another bisphenol such as bisphenol A, on the other hand, may be polymerized to cyclics-free compositions consisting essentially of linear polycarbonates.

The preparation of linear polycarbonates from the cyclic oligomer compositions of this invention is illustrated by the following examples.

EXAMPLES 8-9

Tetra-n-butylammonium tetraphenylborate was added to 1 gram each of the cyclic copolymeric and homopolymeric spirobiindane bisphenol polycarbonate oligomers of Examples 1 and 7, and the mixtures were dissolved in 25 ml. of dry methylene chloride. The solutions were evaporated to dryness under vacuum and further for 4 hours at 110° C. in a nitrogen atmosphere. The solids were heated under nitrogen for 1 hour at 300° C. The polymeric products thus formed were dissolved in methylene chloride, reprecipitated by pouring into methanol, filtered and dried. The relevant parameters and properties are given in the following table.

|  | Example | |
| --- | --- | --- |
|  | 8 | 9 |
| Cyclic product of Example | 1 | 7 |
| Catalyst, mole % | 0.12 | 0.1 |
| Mw | 105,400 | 26,740 |
| Tg, °C. | 188.4 | 202 |

What is claimed is:

1. A method for the preparation of a resinous composition which comprises contacting with a polycarbonate formation catalyst, at a temperature up to about 350° C., a composition comprising cyclic oligomers containing spirobiindane structural units of the formula

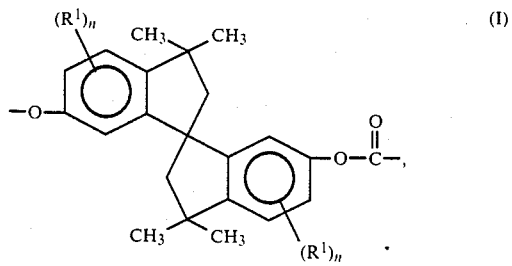

(I)

wherein each $R^1$ is independently $C_{1-4}$ primary or secondary alkyl or halo and n is from 0 to 3.

2. A method according to claim 1 wherein said composition comprises a mixture of cyclic oligomers having varying degrees of polymerization.

3. A method according to claim 2 wherein n is 0.

4. A method according to claim 3 wherein said composition contains no more than 10% by weight of linear oligomers.

5. A method according to claim 4 wherein all of the structural units in said oligomers have formula I.

6. A method according to claim 5 wherein the polycarbonate formation catalyst is a base or a Lewis acid.

7. A method according to claim 6 wherein the polycarbonate formation catalyst is a tetraarylborate salt.

8. A method according to claim 7 wherein the polycarbonate formation catalyst is a tetraalkylammonium tetraphenylborate.

9. A method according to claim 4 wherein at least about 10 mole percent of the structural units in said oligomers have formula I and the balance are different from formula I and have the formula

(II)

wherein at least about 60% of the total number of $R^2$ values are aromatic organic radicals and the balance thereof are aliphatic, alicyclic or aromatic organic radicals.

10. A method according to claim 9 wherein all of the $R^2$ values are aromatic.

11. A method according to claim 10 wherein the polycarbonate formation catalyst is a base or a Lewis acid.

12. A method according to claim 11 wherein each $R^2$ has the formula

(III)

wherein each of $A^1$ and $A^2$ is a monocyclic divalent aromatic radical and $Y^1$ is a bridging radical in which one or two atoms separate $A^1$ from $A^2$.

13. A method according to claim 12 wherein the polycarbonate formation catalyst is a tetraarylborate salt.

14. A method according to claim 13 wherein the polycarbonate formation catalyst is a tetraalkylammonium tetraphenylborate.

15. A method according to claim 14 wherein each of $A^1$ and $A^2$ is p-phenylene and $Y^1$ is isopropylidene.

* * * * *